Patented Nov. 10, 1953

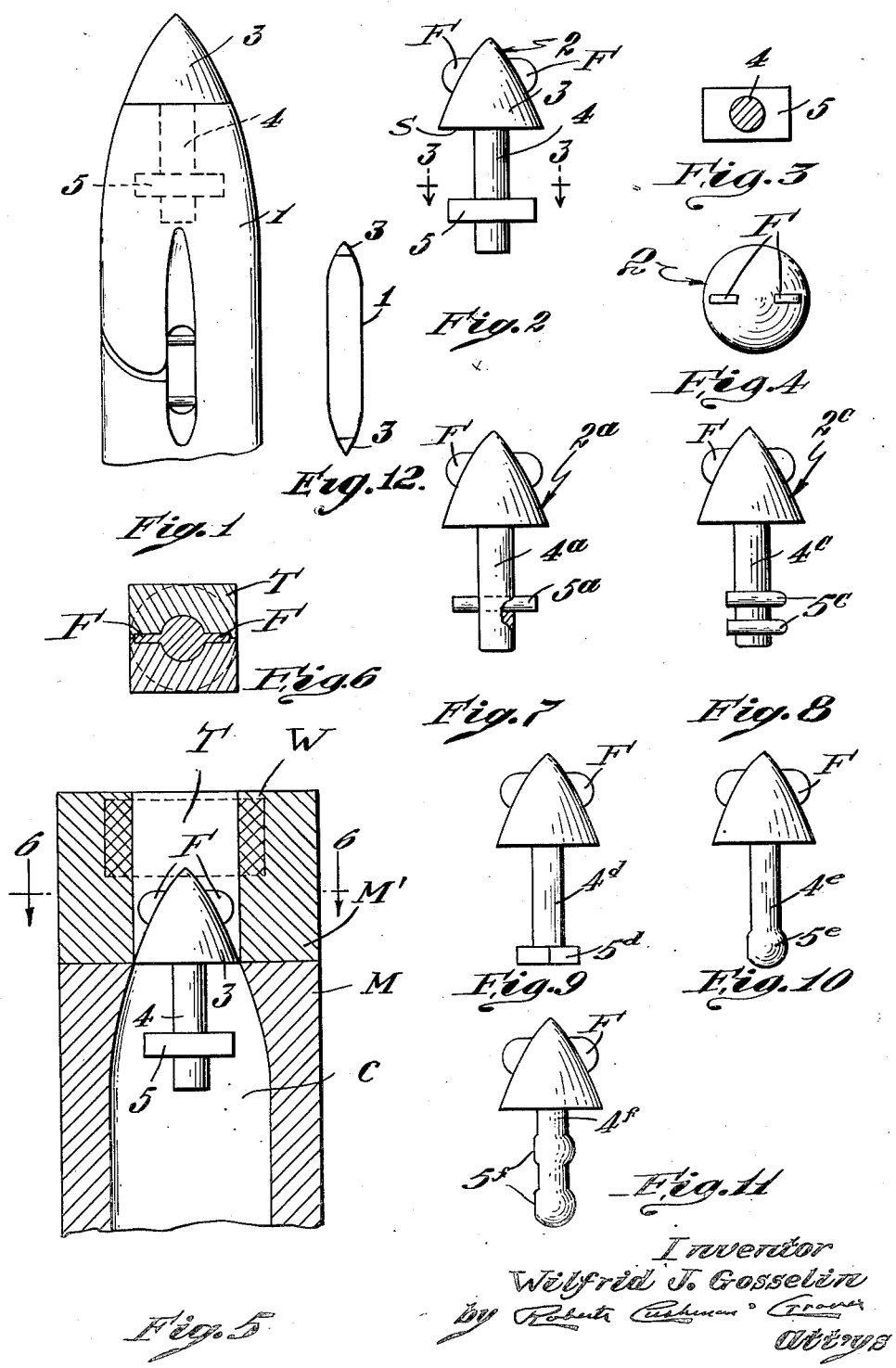

2,658,533

UNITED STATES PATENT OFFICE 2,658,533

WEAVING SHUTTLE OF MOLDED MATERIAL HAVING EMBEDDED TIP-ANCHORING MEANS

Wilfrid J. Gosselin, Methuen, Mass., assignor to U S Bobbin & Shuttle Company, Lawrence, Mass., a corporation of Rhode Island Application September 18, 1951, Serial No. 247,052

8 Claims. (Cl. 139—196)

This invention pertains to weaving shuttles and more especially to an improved means for and method of anchoring the tip to the shuttle body. The body portion of a shuttle is customarily of organic material (as metallic shuttles have not proven practical) but in order that the end of the shuttle may sustain the blows of the picker, the end of the body is reinforced by a metallic tip. Customarily, the connection between the tip and body portion is obtained by driving the cylindrical stem portion of the tip into a bore in the body portion, aiding the union by first coating the stem with adhesive. However, this usual mode of uniting the tip to the body is not wholly reliable and gradual loosening of the tip and eventual splitting of the body portion is not uncommon.

The present invention is based upon the possibility (a possibility made attainable by proper design of the shuttle body and by the selection of an appropriate plastic) of molding a commercially acceptable shuttle body from a moldable material and by a molding operation, and as an incident to the molding operation, permanently attaching the tip. In view of the above possibility, which has been shown to be commercially attainable (as respects its accomplishment and as respects the utility of the resultant shuttle, as attested by a long period of use) the present invention contemplates the employment of a tip so devised that during the molding of the shuttle body the tip will be held accurately in position with respect to the mold, while an anchorage portion of the tip becomes so firmly embedded in the substance of the shuttle body as effectively to hold the tip and body relatively fixed throughout the useful life of the shuttle.

It is an object of the present invention to provide a tip of such construction as to make such anchorage of the tip to the shuttle body a practical matter. A further object is to provide anchorage means for a shuttle tip which is effective not only to prevent relative motion of the tip and body in an axial direction but also to prevent relative rotation of the tip and body. A further object is to provide a tip whose head portion is initially provided with temporary positioning means, subsequently removable, for holding the tip accurately positioned with respect to a mold cavity while the stem portion of the tip is being embedded in the plastic forming the shuttle body. A further object is to provide a shuttle tip of simple and inexpensive design, particularly desirable for use in the manufacture of molded shuttles, which is easily installed, and which has a stem portion which is immovable relative to the body of the completed shuttle. A further object is to provide a novel method of making weaving shuttles. Other and further objects and advantages of the invention will be pointed out in the following more detailed description and by reference to the accompanying drawings wherein Fig. 1 is a fragmentary side view of the end portion of a completed shuttle having the tip of the present invention connected thereto;

Fig. 2 is an elevation of a tip ready for use in accordance with the practice of the present invention;

Fig. 3 is a section on the line 3—3 of Fig. 2;

Fig. 4 is an end view of the tip of Fig. 2, looking toward the point of the tip;

Fig. 5 is a fragmentary, diagrammatic, horizontal section through a mold useful in applying the tip shown in Fig. 1;

Fig. 6 is a section on the line 6—6 of Fig. 5;

Figs. 7, 8, 9, 10 and 11 are views similar to Fig. 2 showing modifications.

Fig. 12 is a side view of the shuttle to smaller scale than Fig. 1, the shuttle being shown as provided with the improved tip of the present invention at each of its ends.

Referring to the drawings, the numeral 1 designates the body of a shuttle which, in accordance with the present invention, is of a molded material, for example, a synthetic resin. The numeral 2 designates a metallic tip of generally conventional type having the conical head portion 3 and the cylindrical stem portion 4, but modified in accordance with the present invention to provide the head 3 with one or more projecting wings or fins F (here shown as diametrically opposed) and to provide the stem 4 with an integral enlargement 5 near its free end and substantially spaced from the under surfaces of the head 3. As shown in Fig. 3, the enlargement 5 is of generally rectangular shape, longer in one dimension than in the other.

In accordance with the present invention, it is contemplated that there will be provided a mold, for example, comprising the parts M and M' (Fig. 4) and a third part, not shown, similar to the part M', arranged at the opposite end of the mold part M. The part M of the mold is provided with a cavity C of a shape corresponding to the outer peripheral contour of the shuttle body. Obviously, proper core elements (not shown) will be employed, in accordance with customary and usual methods of molding materials, to form the bobbin-receiving and other customary cavities in the shuttle body. The part M' of the mold is provided with a central portion T, preferably of soft iron or similar magnetic material, having a cavity in its inner end shaped to receive the head portion 3 of the shuttle tip. As shown in Fig. 6, the part T consists of complemental, separable members which collectively provide the cavity for the reception of the head, the cavity comprising diametrically opposed recesses for the reception of the ears or fins F. Surrounding this portion T is a coil W of conducting wire which, when energized with electric current, causes the part T to become magnetized and thus to hold the head 3 of the shuttle tip firmly in place with the stem 4 accurately coaxial with the part T and with the axis of the cavity C of the mold part M. While the magnet is desirable as additional means for holding the tip in place, the clamping of the fins or ears F of the tip between the opposed parts of the member T is usually sufficient to insure proper location of the stem of the tip in the mold cavity.

In assembling the mold parts, the head 3 of the tip is first introduced into the cavity in the part T with the ears F in the recesses, the ears being clamped between the opposed parts of the member T, and the latter then being introduced into the part M' of the mold. If the magnet W is provided, the magnet coils are now energized so as to draw the head 3 very firmly into the cavity in the part T. The parts M' are now assembled with the part M and the plastic material is introduced into the cavity C, thus embedding the stems 4 of the tips and their enlargements 5 in the plastic material. When the plastic material has set, the mold parts are separated and the molded shuttle body is removed, the stems 4 and their enlargements 5 being so embedded in the end portion of the shuttle body that the tips are immovable relative to the shuttle body and are held firmly anchored in position so that they can neither move axially nor rotate. It may be noted that the part 5 is spaced substantially from the flat undersurfaces of the head 3 so that a substantial portion of the plastic material intervenes between the enlargements 5 and the end of the shuttle body proper, thus providing a very strong anchorage such that the enlargements 5 can not be loosened by blows imparted to the tip 2. The fins F are now removed by the use of a suitable cutting tool or by grinding, thus leaving the head portion of the tip smoothly conical, as shown in Fig. 1.

While the arrangement shown in Figs. 1 to 5 is desirable, it is contemplated that the tip may be provided with anchorage elements of other types. For example, as shown in Fig. 7, the tip $2^a$ has the stem $4^a$ provided with a transverse opening which receives a bar $5^a$ whose ends project outwardly beyond the periphery of the stem. In this case the bar $5^a$ is not integral with the stem. In Fig. 8 the tip $2^c$ has the stem $4^c$ provided with a plurality of integral, axially spaced, unsymmetrical ribs $5^c$.

In Fig. 9, the stem $4^d$ is shown as having an integral, polygonal enlargement $5^d$ at its extreme end. In Fig. 10, the stem $4^e$ has a single bulbous enlargement $5^e$, preferably slabbed off at one side to make it unsymmetrical; and in Fig. 11 the stem $4^f$ has two such bulbous enlargements $5^f$. In all of the several suggested forms the head of the tip has one or more of the positioning fins integrally projecting from the peripheral surface of the conical head.

Regardless of the particular form of enlargement on the stem, the embedding of this enlargement within the molded body of the shuttle insures a firm and secure anchorage for the tip, and while several specific forms of enlargement have been illustrated by way of example, it is to be understood that the invention is broadly inclusive of any and all modifications falling within the scope of the appended claims.

I claim:

1. That stage product in the manufacture of a weaving shuttle by molding which comprises a tip including a conical head and an elongate, rigid stem, the stem having an integral part which is unsymmetrical with respect to the axis of the stem and which projects outwardly beyond the peripheral surface of the stem, and a temporary positioning fin integral with the head and projecting from the peripheral surface of the latter for holding the tip in place in a mold.

2. That stage product in the manufacture of a weaving shuttle by molding which comprises a tip including a conical head and a substantially cylindrical stem, a part attached to the stem and which, in one transverse dimension, at least, exceeds the diameter of the stem proper, the stem and said part being designed to be permanently embedded in and wholly concealed by the material of the body portion of the shuttle, the conical head of the tip having at least one integral fin radiating from its peripheral surface for holding the tip in place in a mold.

3. That stage product in the manufacture of a weaving shuttle by molding which comprises a tip having a conical head and means for attaching the head to the body portion of a shuttle, said attaching means comprising a rigid anchorage element, unsymmetrical with respect to the axis of the head and spaced from the head, a rigid connecting member fixed at one end to the head and at its opposite end to the anchorage element, and a pair of temporary positioning fins integral with the head and radiating from the peripheral surface of the head at diametrically opposite points for holding the tip in place in a mold.

4. That stage product in the manufacture of a weaving shuttle by molding which comprises a tip including a conical head and a substantially cylindrical stem, the stem having an integral, unsymmetrical enlargement which projects outwardly beyond the periphery of the cylindrical portion of the stem, the stem and said enlargement being designed to be permanently embedded in and wholly concealed by the material of the body portion of the completed shuttle, the conical head having diametrically disposed fins projecting from its peripheral surface for holding the tip in place in a mold.

5. That method of making a weaving shuttle having a molded body portion and a metallic tip which comprises as steps providing tips, each of metal and each comprising a head, a stem, an anchorage enlargement on the stem spaced from the head and a tip-positioning fin projecting from the peripheral surface of the head, providing a multi-part mold having a cavity, placing the tips within the mold so that their stems are within the mold cavity and are axially aligned, clamping the positioning fins of the tips between parts of the mold, thereby firmly to hold the tips in place, filling the mold cavity with plastic material to form the shuttle body, separating the mold parts after the plastic has set, and removing the positioning fins from the tips.

6. That method of making a weaving shuttle according to claim 5 and wherein each tip has a plurality of positioning fins integral with and radiating from its peripheral surface, further characterized in removing all of said fins after the completion of the molding operation, thereby leaving the peripheral surfaces of the tips smooth and symmetrical.

7. The method of making a weaving shuttle according to claim 5, further characterized in establishing a magnetic field at each end of the mold, thereby additionally to hold the tips in place during the molding operation.

8. That stage product in the manufacture of a weaving shuttle by molding, which comprises a body portion of molded organic material with a metallic tip at each end, each tip having a conical head and an elongate attaching element provided with an integral, unsymmetrical enlargement spaced from its head, the attaching element and said enlargement of each tip being permanently embedded in the material of the body portion, each tip having an integral fin projecting from the peripheral surface of its conical head.

WILFRID J. GOSSELIN.

References Cited in the file of this patent

UNITED STATES PATENTS

| Number | Name | Date |
|---|---|---|
| 1,516,671 | D'Arcy | Nov. 25, 1924 |
| 1,764,662 | Tomlin | June 17, 1930 |
| 1,918,505 | Wallenberg | July 18, 1933 |
| 2,550,273 | Krukonis | Apr. 24, 1951 |